United States Patent
Van Den Heuvel et al.

(10) Patent No.: US 6,223,030 B1
(45) Date of Patent: Apr. 24, 2001

(54) COMMUNICATIONS OPERATING SYSTEM AND METHOD THEREFOR

(75) Inventors: Anthony Van Den Heuvel, Lightwater; Nicholas Whinnett, London; William Robinson, Farnham; Jon Gibbs, Southampton, all of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/676,106

(22) PCT Filed: Nov. 2, 1995

(86) PCT No.: PCT/EP95/04301

§ 371 Date: Nov. 13, 1996

§ 102(e) Date: Nov. 13, 1996

(87) PCT Pub. No.: WO96/14719

PCT Pub. Date: May 17, 1996

(30) Foreign Application Priority Data

Nov. 7, 1994 (GB) .................................................. 9422449

(51) Int. Cl.⁷ ........................................................ H04Q 7/20
(52) U.S. Cl. ............................ 455/422; 455/67; 455/517
(58) Field of Search .................................... 455/422, 426, 455/427, 461, 462, 465, 67, 67.4, 517, 436, 552

(56) References Cited

U.S. PATENT DOCUMENTS

| | | | |
|---|---|---|---|
| 5,301,359 | * 4/1994 | Van Den Heuvel | 455/56.1 |
| 5,313,653 | * 5/1994 | Sasuta | 455/17 |
| 5,434,798 | * 7/1995 | Madebrink et al. | 364/514 |
| 5,548,631 | * 8/1996 | Krebs et al. | 379/58 |
| 5,613,213 | * 3/1997 | Naddell et al. | 455/54.1 |
| 5,659,598 | * 8/1997 | Byrne et al. | 455/436 |

FOREIGN PATENT DOCUMENTS

| | | | |
|---|---|---|---|
| 0365200A2 | 4/1990 | (EP) . | |
| 0459344 | * 5/1991 | (EP) | H04Q/7/04 |
| 92/14308 | * 8/1992 | (WO) | H04B/7/00 |

OTHER PUBLICATIONS

R. Steele and J.E.B. Williams, Third generation PCN and the intelligent multimode mobile portable, Electronics & communication Engineering Journal pp. 155–156, Jun. 1993.*

* cited by examiner

Primary Examiner—Daniel S. Hunter
Assistant Examiner—Darnell R. Armstrong
(74) Attorney, Agent, or Firm—Kenneth A. Haas

(57) ABSTRACT

A communications operating system is provided herein. The communications operating system having a common communication system comprising a radio frequency transceiving means for transmitting and receiving radio frequency signals and a system list means for storing a list of communication systems available. The system also includes a feature list means for storing a list of feature programs, where the feature programs comprise at least one of an enabling program to enable resident functions, a high-level design specification, and an executable feature specification.

14 Claims, 7 Drawing Sheets

COMMUNICATIONS OPERATING SYSTEM AND METHOD THEREFOR

FIELD OF THE INVENTION

The present invention relates, in general, to communication systems and, more particularly, to a communications operating system and method therefor.

BACKGROUND OF THE INVENTION

Within the past several years, radio frequency (RF) communication systems have gone from a very limited number of systems, each available for one type of function, to a vast number of potential systems available for providing the same type of basic service. For example, cellular communication systems began in Europe with the Nordic Mobile Telephone (NMT) system. At the time, this was the only system which provided mobile dial-up telephone operations. Since its introduction, newer analog systems have been introduced, such as Total Access Communication System (TACS), and, more recently digital systems such as the Groupe Spécial Mobile (GSM) (now commonly referred to as the Global System for Mobile communications), DCS-1800 (Digital Cellar System), CT-2 (Cordless Telephone), and DECT (Digital European Cordless Telephone) systems. Further, there are considerable numbers of systems each serving a specific customer service demand such as the European Radio Messaging System (ERMS) for paging and Ministry of Posts and Telecommunications standard MPT 1327 (A Signalling Standard to Trunked Private Land Mobile Radio Systems) for private mobile radio applications. These systems often overlap in their coverage areas. Thereby giving users an option as to which system to select.

There is also a proliferation of new systems being developed, such as the American Digital Cellular (ADC), referred to as Interim Standard 54 (IS-54), and a Personal Digital Cellular (PDC) standard being developed in Japan, referred to as the RCR (Research & Development Center for Radio Systems) standard 27. There is also a Code Division Multiple Access (IS-95) system being developed as a higher capacity/higher quality alternative to the existing systems. In addition to what is normally considered cellular, there are a number of Personal Communication Systems (PCS) and wireless local loop systems being developed that are all competing for customers. Some of these systems will be based on existing protocols (such as the DCS-1900 (Digital Cellular System) being based upon GSM).

Also, some previous land mobile trunking systems are offer dial-up telephony services. One future system currently under design is the Future Land Mobile Public Telephone System (FLMPTS).

However, one problem for the end user is that to be able to go anywhere in the world and use a subscriber unit, the user would need to carry a dozen or more subscriber units since one unit will not operate on all of the systems. By way of example, even though GSM and ADC operate on similar Time Division Multiple Access (TDMA) technologies, there is presently no way to take your GSM phone to America and have it operate on a ADC system.

In addition, even within the same system, the mobile owned by a user may have limitations built in during its original programming that prevent it from using features subsequently developed for a particular system. While there are some subscriber units available today that can be returned and reprogrammed (either electronically or by replacing some of the memory devices containing the programming), the user often finds themselves with a subscriber unit that has become obsolete in just a short time.

A related invention is found in "Bulletin Board Resource for Communication System Access" (U.S. Pat. No. 5,301,359) invented by VandenHuevel et al. and assigned to Motorola Inc. This invention describes a method of providing information regarding communication system capabilities for multiple, independent RF communication systems. The method comprises the steps of monitoring an RF bulletin board that is independent of the multiple, independent RF communication systems; and receiving information from the RF bulletin board regarding the multiple RF communication systems.

Another type of system is described in EP-A2-0 365 200, Majbudar et al. This application describes a telecommunication system in which a subscriber (which includes a touch screen display and a customer premises computer) can, by use of the computer, transmit a request to a central office to provide an appropriate software package to activate a feature of the phone. This application is similar, and in fact uses, a standard ISDN process to transfer a program from one computer to another. The result then is that while certain features in the phone may be activated, it does not address the issue of providing access to multiple communication systems operating using different protocols.

DETAILED DESCRIPTION OF THE DRAWINGS

Figure 1:
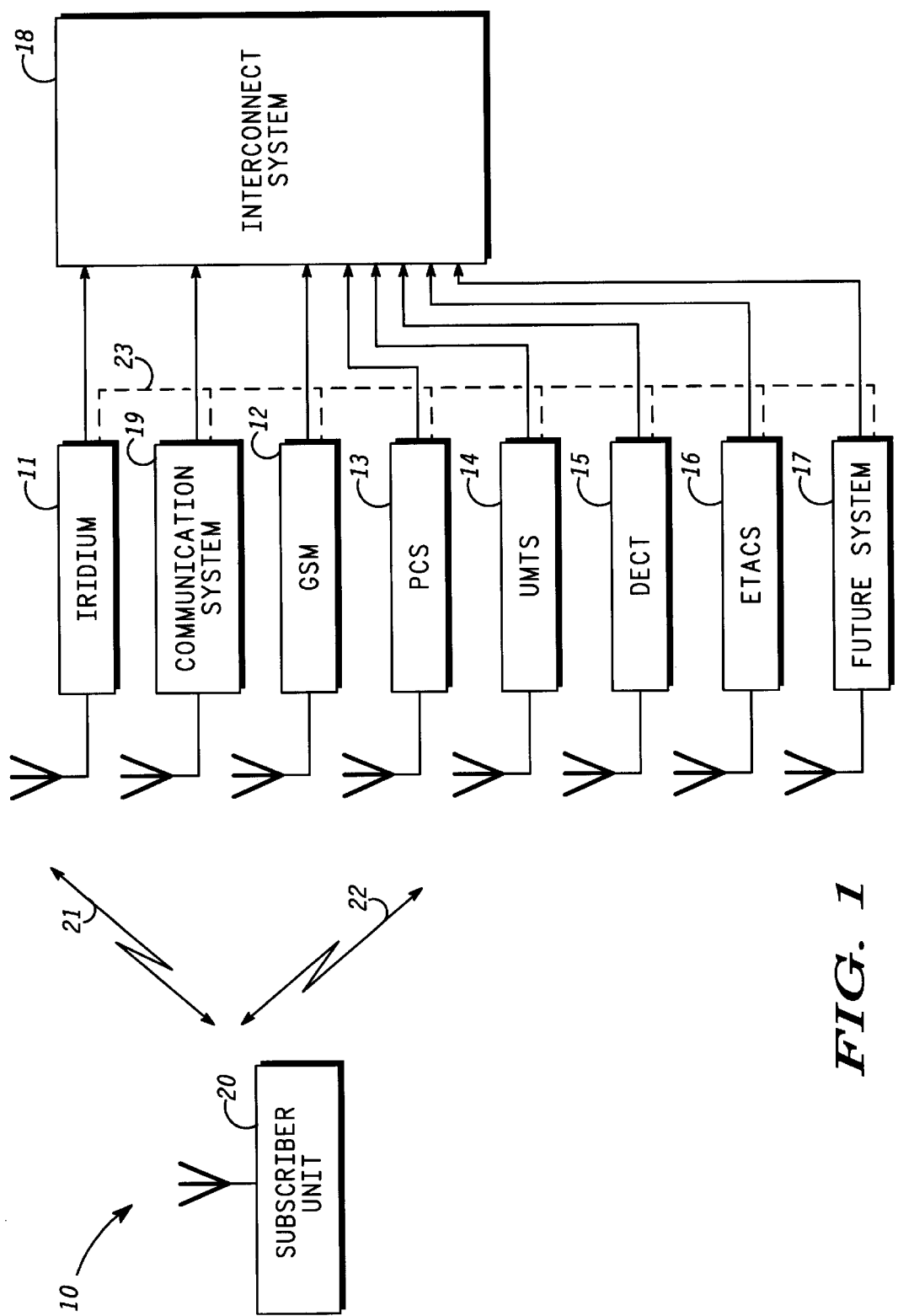
FIG. 1 is a block diagram of a network utilizing the present invention.

Referring initially to FIG. 1, a block diagram of a network, generally designated 10, utilizing the present invention is illustrated. In network 10, there are a plurality of communication systems 11–17 all coupled through a wireline system 18 to a common communication system 19. Interconnect system 18 would potentially be a wireline system, such as an Integrated Services Digital Network (ISDN). The systems may also be directly connected along line 23. In FIG. 1, a subscriber unit 20 is seeking access to one of the communication systems in network 10. To accomplish this access, subscriber unit 20 will first access common communication system 19 using a channel 21. Common communication system 19 will reply to subscriber unit 20 with a list of systems available for use in network 10. Along with the list of available systems, system 19 may also provide information on types of features available and on system costs.

Once subscriber unit 20 has determined which system it desires to utilize, it will make a request to common communication system 19 and receive an enabling program for the selected communication system. Subscriber unit 20 will then open a channel 22 with the selected communication system, in this case Universal Mobile Telecommunication System (UMTS) 14.

Figure 2:
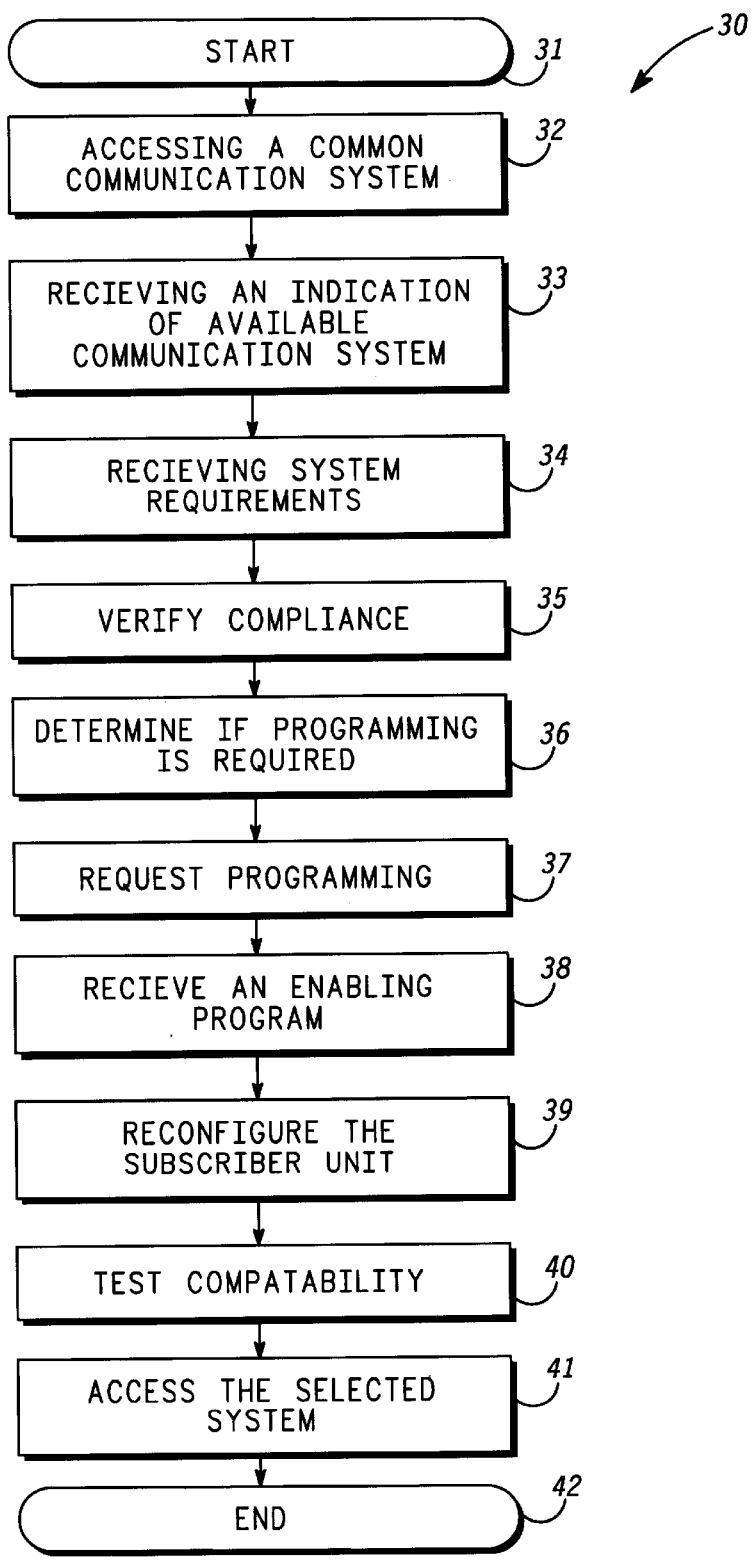
FIG. 2 is a flow chart illustrating a process embodying the present invention.

The process of accessing the selected communication system is illustrated in more detail in FIG. 2, by a process, generally designated 30. Process 30 begins with step 31. This may be implemented when a user starts to make a call using a subscriber unit or when a user first enters an area covered by the common communication system. The subscriber unit then accesses the common communication system, step 32. This may be performed passively, in that the subscriber unit may only monitor the information being transmitted by the common communication system. However, at some point, the subscriber unit will need to request and be assigned to a channel of the common communication system.

Once the subscriber has accessed the channel of the common communication system, it receives an indication of available communication systems within the coverage area of this common communication system, step 33. This indications of available systems may be general, as in a "GSM" system is available; or provide more detail, such as a "half-rate GSM" system is available or one with a particular feature.

At this point, the common communication system may also provide a list of any requirements of a particular communication system, step 34. Such requirements may include display capabilities, power, frequency band, modulation scheme, etc. This would then be followed by a verification by the subscriber unit that it is, or can be made, compliant with any of those requirements, step 35.

The subscriber units envisioned for this type of system will be capable of being programmed over the air and may also be provided with stable memory of some pre-programmed systems. Depending upon the system selected and the resident programming of the subscriber unit, the subscriber unit then determines if any non-resident programming is required, step 36. If programming is required, the subscriber unit will request the programming from the common communication system, step 37. The common communication system will respond by transmitting the enabling program, which will be received by the subscriber unit, subprocess 38.

Figure 3:
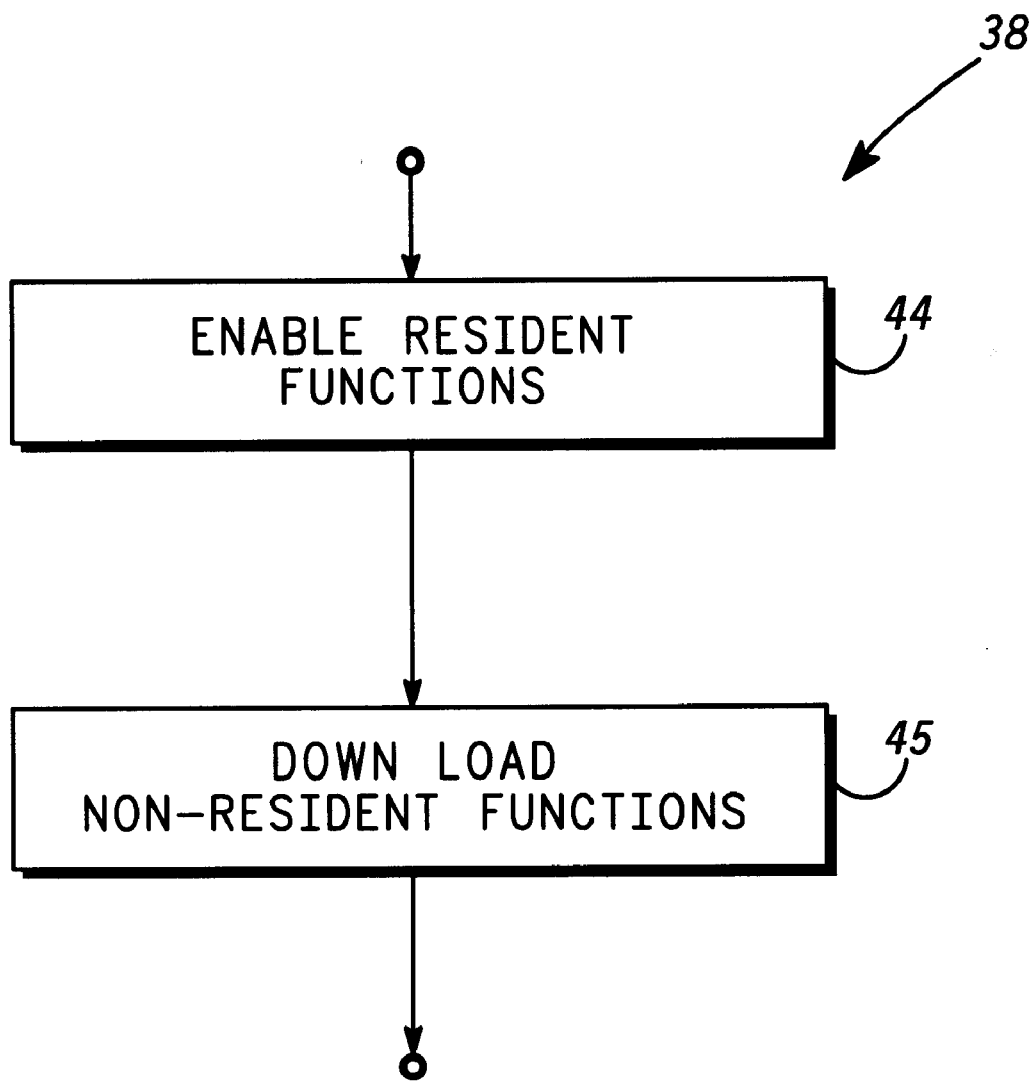
FIG. 3 is a flow chart illustrating a subprocess of the process illustrated in FIG. 2.

Subprocess 38 will generally consists of one or more of the steps illustrated in FIG. 3. In order to be enabled to function on a selected communication system, the subscriber unit may require certain programming. This programming may be provided either by way of enabling functions that are already resident in the subscriber unit, step 44; or by providing non-resident functions, step 45. A type of resident function may be an indicator of what type of coding or encryption process is used by the selected system. The subscriber unit would have several of these present in memory and only need to be told which one to utilize. An example of a non-resident function would be any new type of capability that may be added to the system. For example, a new type of hand-off algorithm may have been implemented since the subscriber unit's last memory update.

The non-resident function provided to the subscriber unit may be provided either by providing a specification that can be executed directly by the subscriber unit; or by providing a high level design specification. If a high level design specification is provided, the subscriber unit will generate, or elaborate, its own executable specification. As part of this, non-resident functions, once received, may be stored in a non-volatile memory thereby becoming resident functions. Along with this, older resident functions may be removed from the subscriber unit.

Returning now to FIG. 2, process 30 continues with step 30 where the subscriber unit configures itself to operate on the selected communication system. When this occurs, the subscriber unit may disconnect from the common communication system, or it may remain in contact. This would probably, but not necessarily, require a dual mode type of subscriber unit. This concept is known in the art and is currently available for subscriber units operating on both AMPS and ADC systems in the United State of America.

After the subscriber unit has been configured, step 39, it will then test its compatibility, step 40, by determining if it meets any requirements of the selected communication system. If the test is satisfactory, the subscriber unit will then access the selected communication system, step 41. This may be accomplished through the receipt of a hand-off instruction from the common communication system or by a direct request from the subscriber unit.

Once the access has been completed, process 30 ends, step 42.

Figure 4:
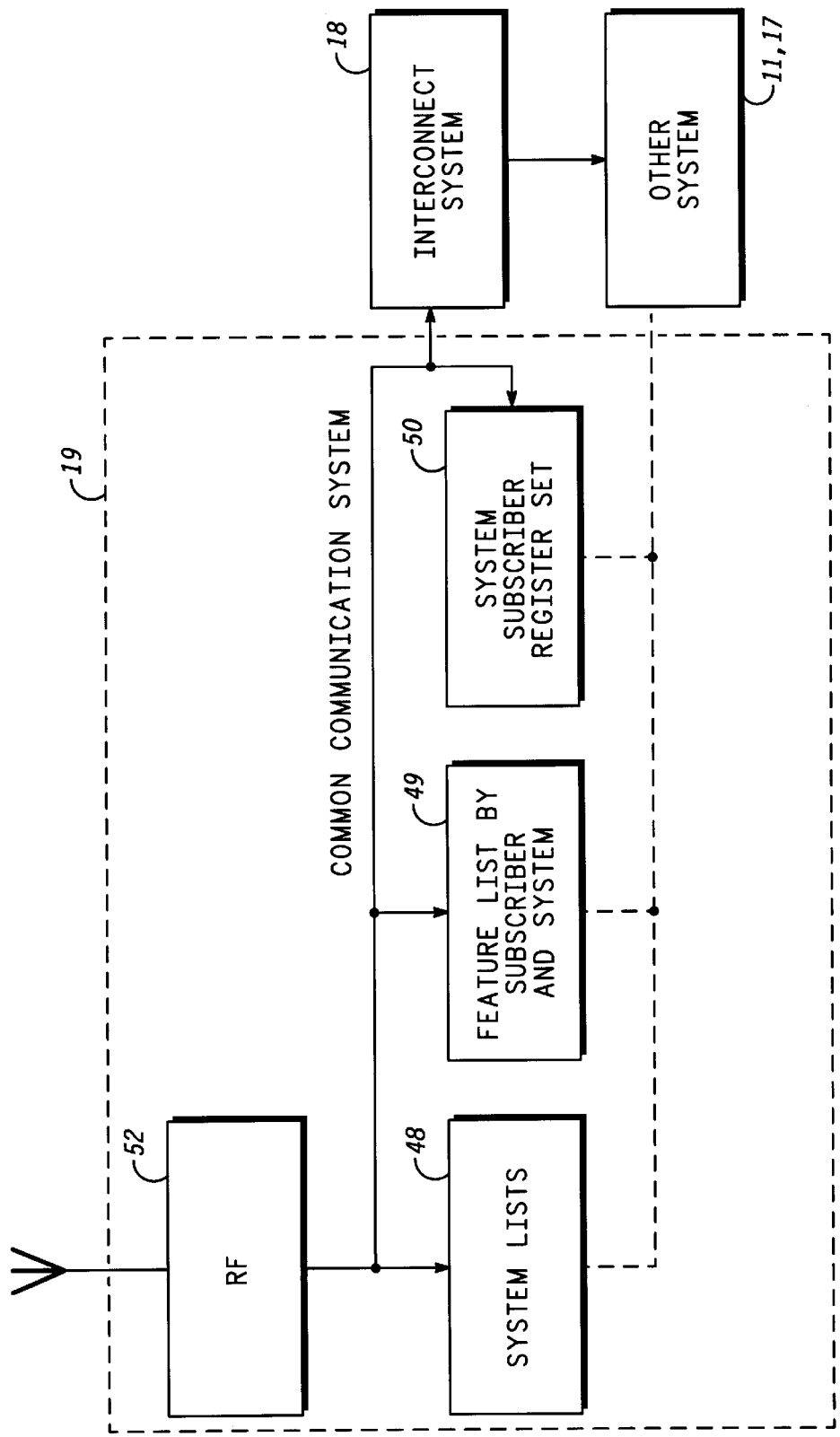
FIG. 4 is a more detailed block diagram of the common communication system of FIG. 1.

Referring now to FIG. 4, a more detailed block diagram of common communication system 19 is provided. System 19 would preferably consist of RF equipment 52 as normally associated with any mobile communication system. The particular protocol of operation is not important for the present invention, but would, for example, be a derivative of one of the basic type of system. Alternatively, the protocol may be a completely new design to maximize its efficiency. In addition, system 19 would contain a list 48 of other communication systems available. This list may be a simple list of systems available or it may contain addition information on the individual systems. This additional information may be feature capabilities, system requirements, system cost, etc.

Common system 19 will also contain a feature list. This list would be in the form of a matrix having features cross referenced by subscriber unit capabilities. In addition, each feature would have either or both of an executable specification a high level design specification. This list would then be used to generate the programming information sent to the subscriber unit.

Common system 19 may also contain a system subscriber register 50 for all of the systems in the network. With this information, the system may determine if the subscriber unit is permitted access to the selected system before taking resources to provide the subscribe with the programming requested. It can also be used by the other systems, either by way of interconnect system 18 or directly by bus 23, to set-up billing information on the subscriber. An alternative method would be to locate this register with the individual systems.

Figure 5:
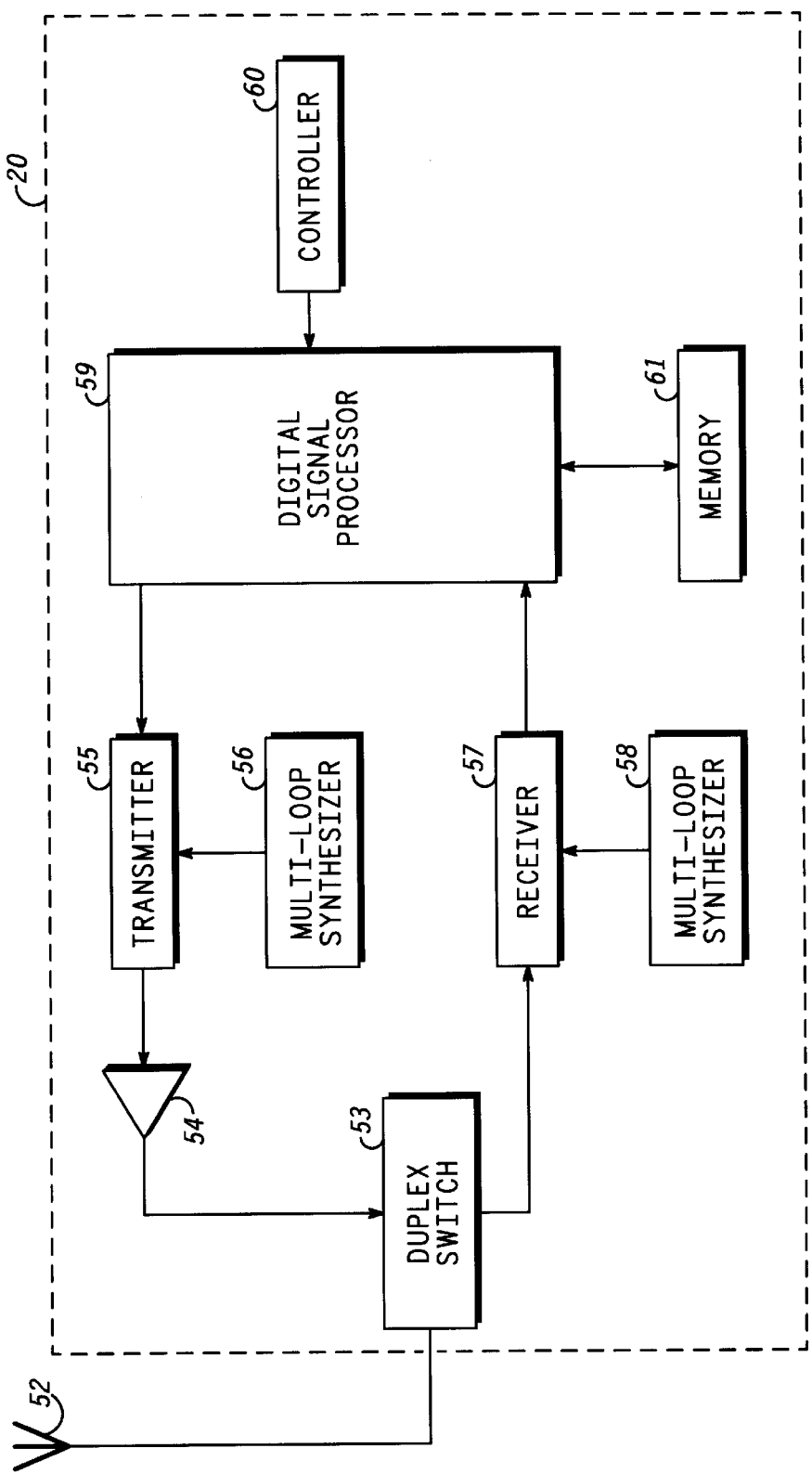
FIG. 5 is a more detailed block diagram of the subscriber unit of FIG. 1.
Figure 6:
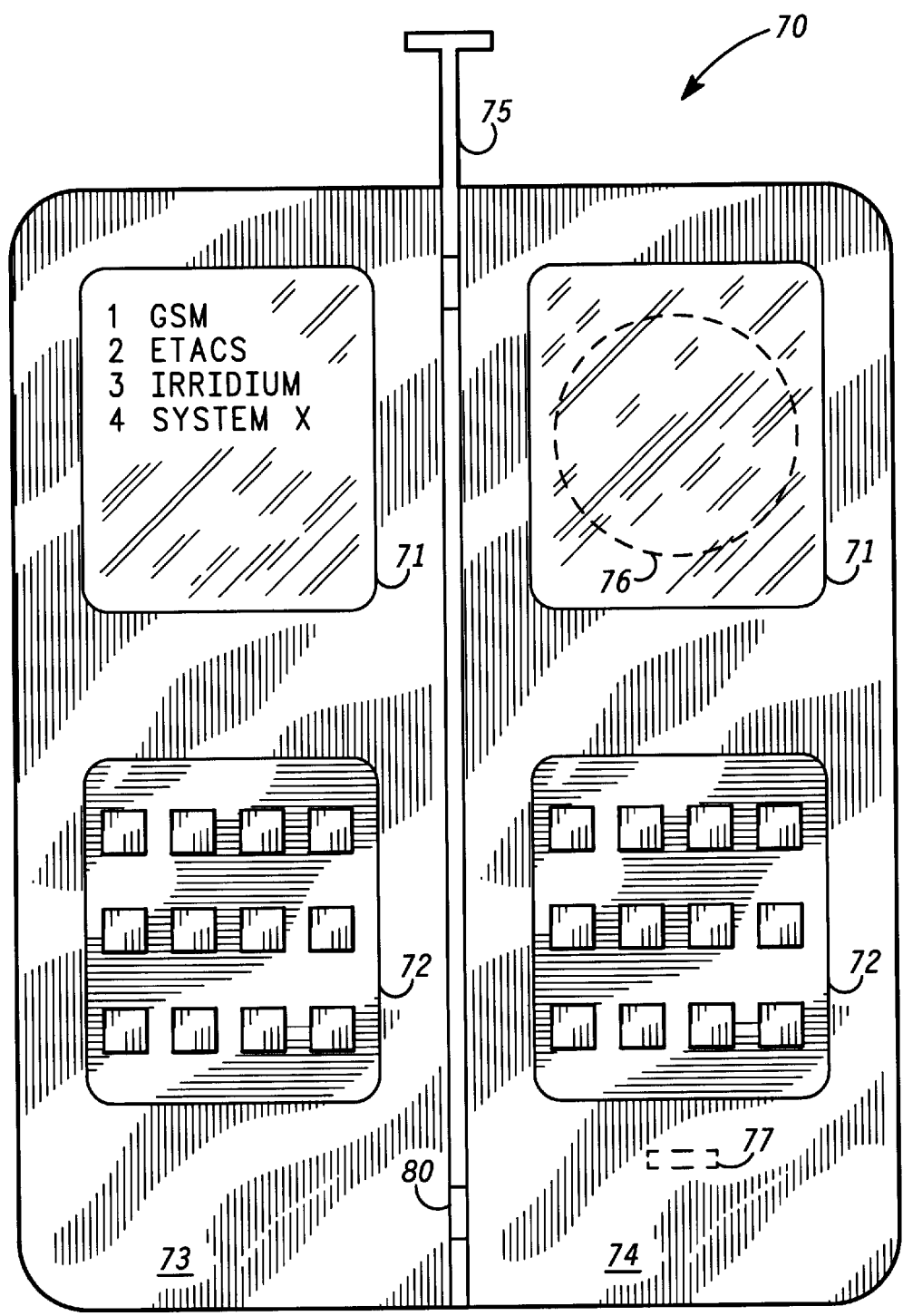
FIG. 6 is a frequency band chart.

In FIG. 5, a general block diagram of subscriber unit 20 is illustrated. Subscriber 20 has the typical duplex switch 53 for coupling antenna 52 to transmitter 55 and receiver 57. Transmitter 55 is coupled to duplex switch 53 through an amplifier 54. Transmitter 55 end receiver 57 each have multi-loop synthesizers 56 and 58, respectively. Synthesizer 56 and 58 permit subscriber 20 to operate at different frequency ranges. It should be noted here, that while subscriber 20 is meant to be a generic, programmable type of radiotelephone, it is not necessarily meant to work in every possible system. For example, in FIG. 6 a frequency band chart of many of today's existing and planned systems is represented. Subscriber 20 may be designed to operate over a series of these systems, such as Band I or Band II (or the lower or upper portions of Band II).

Returning now to FIG. 5, subscriber 20 further consists of a digital signal processor (DSP) 59, a controller 60, and a memory 61. When the enabling program is received from the network, controller 60 will use this to coordinate the programming of DSP 50. As described above, some of the functions may be resident in subscriber unit 20. For resident functions, the executable code will be retrieved from a memory 61, which may, if preferable, be physically located in DSP 59 or controller 60.

Figure 7:
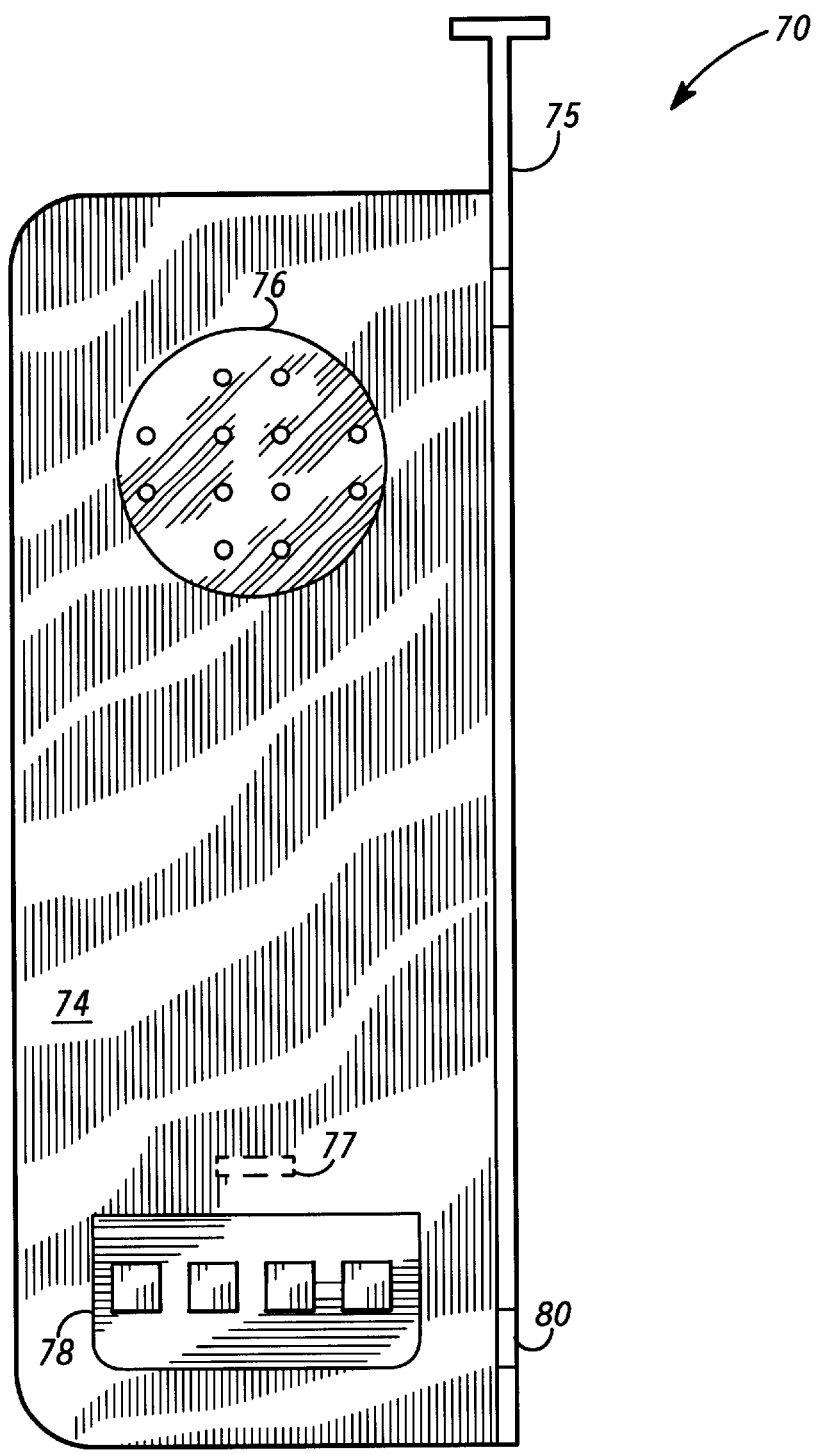
FIG. 7 illustrate designs of a subscriber unit which may potentially utilize the present invention.

Finally, in FIGS. 7 and 8, a design of a subscriber unit 70 capable of utilizing the present invention is illustrated. Subscriber unit 70 is a combination personal data assistant (PDA) and radiotelephone. It consist of a display 71 and a keypad 72 which are each divided between two portions, 73 and 74, of PDA 70. Portions 73 and 74 are joined by a hinge 80 which permits the two portions to be closed upon each other, as illustrated in FIG. 8. On the outside of portion 74 is a speaker 76 and an microphone 77. Optional keys, or buttons, 78 are also provided on the outside portion to be used for certain general functions such as: call answer, call end, power on/off, etc.

In operation, when PDA 70 accesses the common network, a list of available systems is displayed in display 71. The user can then select the system desired using the keypad. The process described above in FIG. 2 will then continue by providing enabling programming to PDA 70. PDA 70 may then be closed and used are radiotelephone.

Thus, it will be apparent to one skilled in the art that there has been provided in accordance with the invention, a communications operating system and method of operation that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of accessing a selected communication system with a subscriber unit, said method characterized by the steps of:
   accessing a common communication system;
   receiving an indication of any communication system available in a geographic region associated with said common communication system;
   requesting access to said selected communication system of said communication systems; and
   receiving an enabling program for selected communication system, wherein said enabling program enables said subscriber unit for a purpose of communicating with said selected communication system in accordance with a protocol of said selected communication system.

2. The method of claim 1 further characterized by the steps of:
   configuring said mobile to operate in accordance with the protocol of said selected communication system; and
   accessing said selected communication system using said protocol.

3. The method of claim 2 further characterized by said configuring being derived in accordance with said enabling program.

4. The method of claim 2 further characterized by the step of testing the compliance of said mobile with the requirements of said selected communication system prior to the step of accessing said selected communication system.

5. The method of claim 1, prior to the step of receiving said enabling program, further characterized by the steps of:
   determining if programming of said mobile to operate on said selected communication system is required; and
   requesting said programming from said common communication system.

6. The method of claim 1 wherein said step of receiving said enabling program consists of at least one of the following steps:
   enabling an existing resident function within said mobile; and
   downloading a non-resident functional instruction to said mobile.

7. The method of claim 6 wherein said non-resident program comprises at least one of:
   a high level design specification; and
   a specification which can be executed directly as a function by said mobile.

8. The method of claim 7 wherein said high level design specification is automatically elaborated by said mobile resulting in a function of said mobile.

9. The method of claim 1 wherein said selected communication system is selected upon the basis of features identified by said indication provided by said selected communication system.

10. The method of claim 1 further characterized by the step of verifying whether a user is permitted access to said selected system following said step of requesting said selected communication system.

11. The method of claim 1 wherein said indication received comprises at least one of the following:
    a cost related to said communication systems; and
    a feature of said communication systems.

12. The method of claim 1 further characterized by the steps of
    receiving a system requirement from said common communication system; and
    verifying that said mobile is capable of complying with said system requirement.

13. A communications operating system having a common communication system comprising:
    radio frequency transceiving means for transmitting and receiving radio frequency signals;
    system list means for storing a list of communication systems available; and
    feature list means for storing a list of feature programs, wherein the feature programs comprise at lest one of an enabling program to enable resident functions, a high-level design specification, and an executable feature specification.

14. The communication operating system of claim 13 wherein said system list means contains at least one of:
    a communication system feature;
    a communication system requirement; and
    a communication system cost.

* * * * *